Nov. 7, 1933.    R. E. BOHRER    1,934,163
FRONT WHEEL DRIVE MECHANISM
Filed Dec. 12, 1930    2 Sheets-Sheet 1
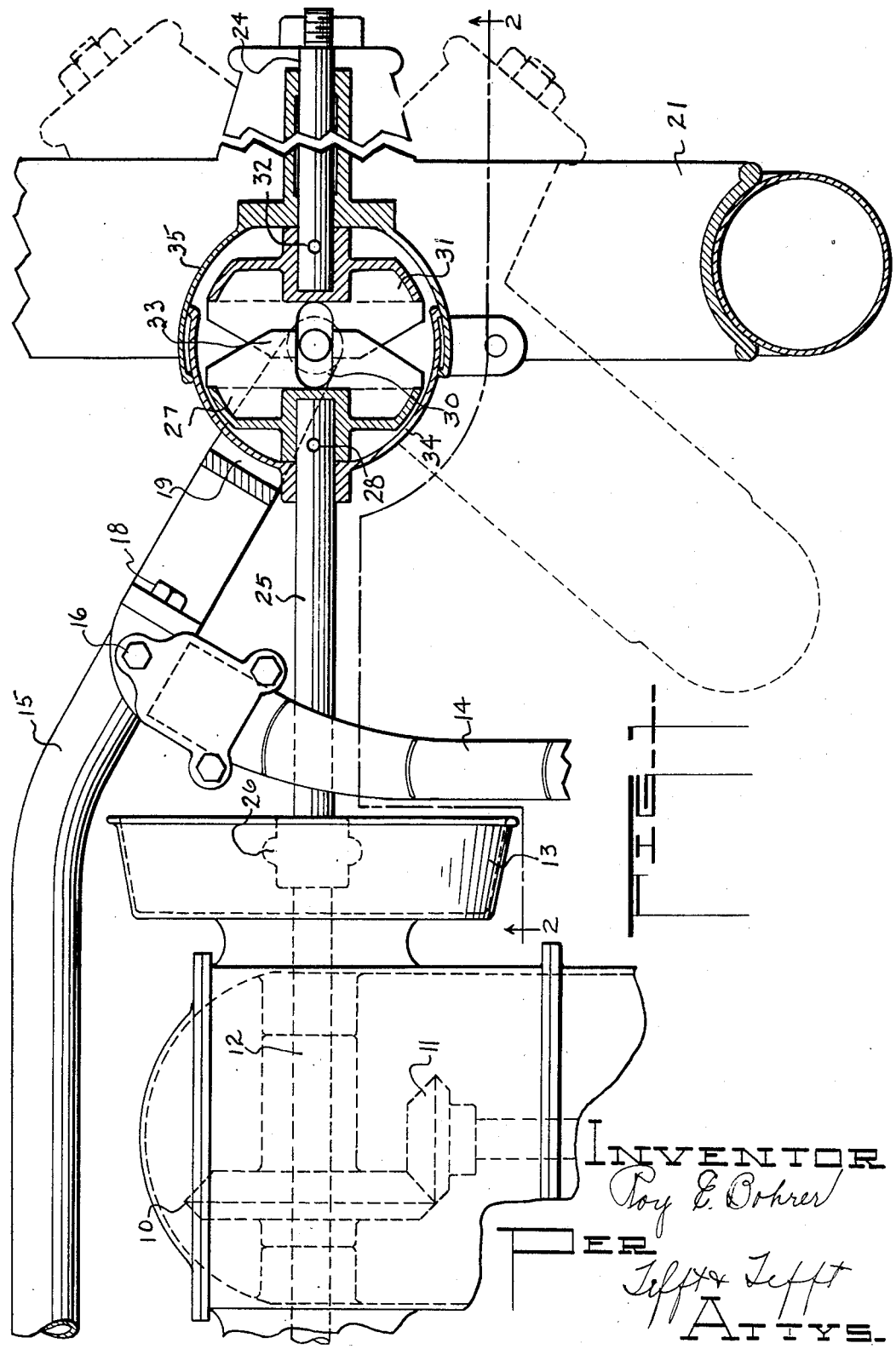
INVENTOR
Roy E. Bohrer
PER
Tefft & Tefft
ATTYS.

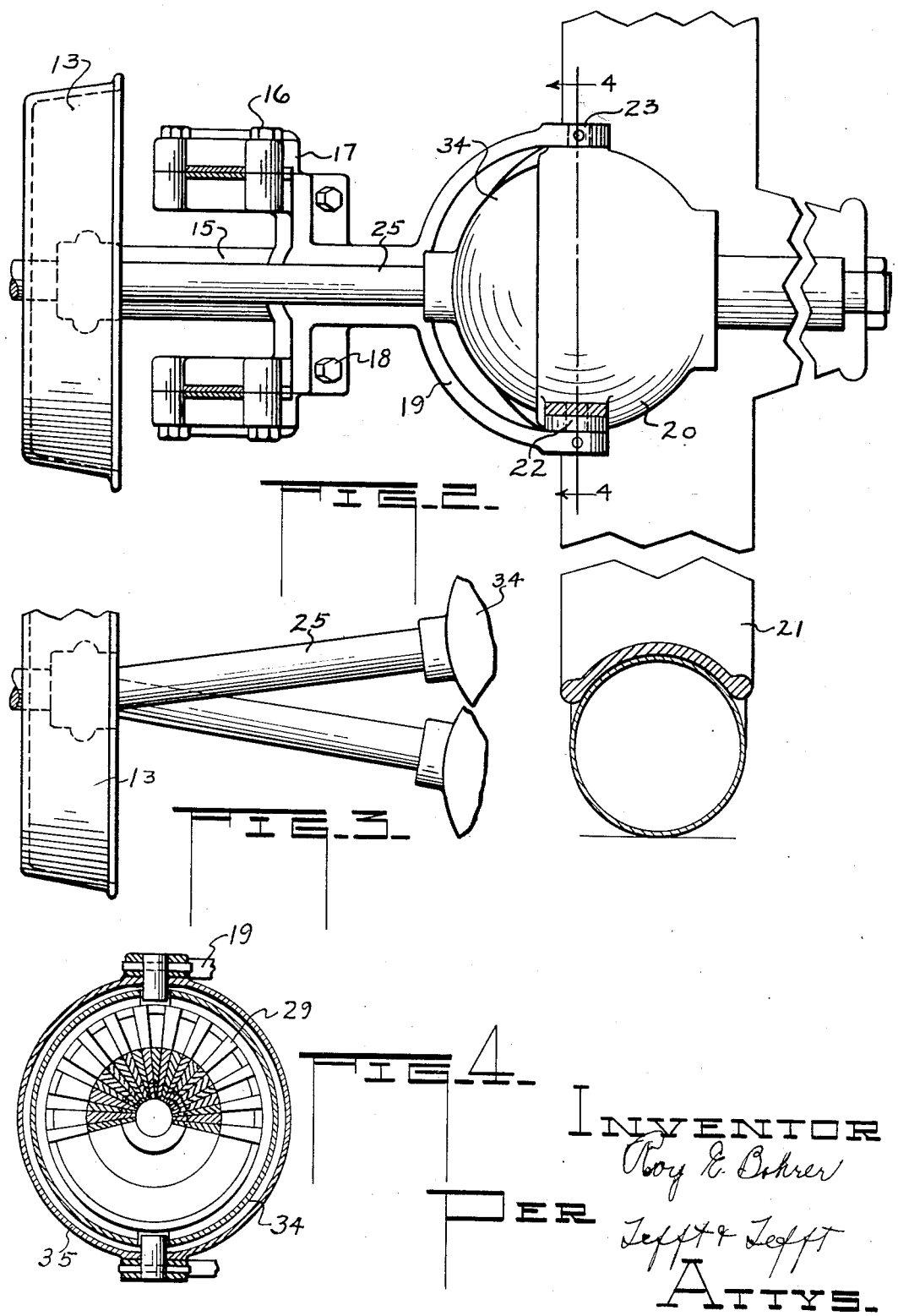

Patented Nov. 7, 1933

1,934,163

UNITED STATES PATENT OFFICE 1,934,163

FRONT WHEEL DRIVE MECHANISM

Roy E. Bohrer, Normal, Ill.

Application December 12, 1930
Serial No. 501,796

1 Claim. (Cl. 180—43)

This invention relates to front wheel drive mechanism.

One of the objects of the invention lies in the provision of a connecting means between the driving mechanism and wheel portion which permits of a particular and efficient front wheel drive.

Another object lies in the provision of front wheel drive mechanism which includes a particular connecting means between the wheel and front axle and a cooperating relationship thereof with the framing portions of the vehicle.

Still another object lies in the provision of front wheel drive mechanism, including a connection between the framing portion and the front axle, which includes co-operating gear members so arranged as to permit the necessary turning radius of the wheels.

A further object lies in the provision of driving mechanism for the wheel portions of a motor vehicle, including a cooperating relationship of the frame, driving axle and wheel portion which permits proper turning radius of the wheels by means of a particular gear arrangement and connection between the wheel and axle.

Other objects will appear in the following specification, taken in connection with the annexed drawings, in which—

Fig. 1 is a plan view showing the manner of connecting the driving mechanism and front wheel to the framing structure of a motor vehicle;

Fig. 2 is an elevational view, partially in section, taken on the line 2—2 of Fig. 1;

Fig. 3 is an enlarged elevational showing of a portion of the front driving mechanism; and Fig. 4 is a sectional view, taken on the line 4—4 of Fig. 2.

Before referring particularly to the drawings, it might be stated that the present application is directed primarily to motor vehicles of the so-called front wheel drive. In this particular construction there is a considerable difference from an ordinary motor vehicle construction, in that the motor is connected with the front wheel drive by means of considerably shorter driving rods, thus increasing greatly the power of the wheels as well as furnishing such power at a more efficient point.

This application is directed primarily to the combination which includes the direct connection between the front wheels and the driving rods connected with the motor. It is apparent that even though the power is applied to such front wheels, nevertheless same must be permitted a sufficient degree of turning radius.

Referring specifically to the drawings, in Fig. 1 is a plan disclosure of the necessary portions of a front wheel drive mechanism. For simplicity of disclosure, the motor has not been shown but the conventional gear connections 10 and 11 appear, which complete the means for transmitting power to the front drive mechanism which includes the horizontally disposed drive shaft 12. This drive shaft has braking apparatus of conventional design, as shown at 13. Inasmuch as such brake mechanism forms no part of the present application, the same has been disclosed merely in a general manner.

Means for attaching the engine and vehicle to the front framing portion is provided in the forwardly projecting springs 14, the same being connected to the forward motor vehicle framing structure 15, as shown in detail in Fig. 2 of the drawings, wherein such spring portions are received and satisfactorily clamped as at 16 in the bracket 17, which is either bolted to, as at 18, or forms an integral portion of, the before mentioned framing portion 15.

In Fig. 1 of the drawings, the connection between the frame and wheel mount is shown solely for a single wheel. The end of the frame 15 is bifurcated as at 19 in a manner to receive a similarly bifurcated portion 20 which provides the support upon which the wheel portion 21 of the front wheel rotates in a free manner. The connections between the bifurcated portions 19 and 20 are provided in the pivots 22 and 23.

It is apparent from the above construction that the wheel, due to such pivoting, is permitted a satisfactory degree of radius for the turning movement.

The manner of mounting the wheel 21 upon the wheel supporting portion 20, which as previously described as a pivotal relationship with the bifurcated member 19, is accomplished as shown in Fig. 1 of the drawings, wherein such wheel is fixedly secured in a conventional manner to the stub shaft 24, which as later to be described, is driven through a particular gear arrangement from the motor driven shaft 12.

Now, with respect to the manner of driving the front wheels, the drive shaft 25 is connected with the previously described drive shaft 12 through the universal joint construction 26. This construction is necessary to take care of the relative movement of the engine and mount and the front framing portion of the vehicle due to the spring mounting thereof.

The actual connection between the shaft 25 accomplishing rotation of the shaft 24, upon which the wheel is mounted, is provided in an arrangement of gears now to be described. Gear 27 is fixedly secured at 28 to the outer end of the drive shaft 25, said gear being formed with a series of radiating gear teeth 29 fashioned in the manner shown in Fig. 4.

This gear is cut out as at 30 to permit the projection therethrough of the vertical pivot which, as previously described, connects the bifurcated portions 19 and 20. An opposed gear 31 is secured as at 32 to the stub shaft 24 driving the motor vehicle wheel. This gear 31 is fashioned in exactly the same manner as gear 29 and is faced in a cooperating angular manner as shown at 33, so as to coincide with said gear, irrespective of the angular position of the wheel with the motor vehicle frame. In other words, there is always a positive driving connection between the stub shaft 24 and the drive shaft 25 by means of the before mentioned gears, irrespective of the angular position of the drive shaft 25 or the angular position of the wheel necessary during the turning movement thereof. Dust housing preventing the entrance of dust, grease and other extraneous matter is provided for the respective gears by means of the housing portions 34 and 35 connected respectively to the drive shaft 25 and the stub shaft 24.

With respect to the operation of the front wheel drive mechanism, it may be explained that due to the particular arrangement of gears in the driving mechanism thereof, there is permitted a drive to the front wheels of a motor vehicle which not only permits their turning but a constant drive thereto, irrespective of the angular position thereof necessary in such turning movement. The drive to the front wheels when using applicant's particular arrangement of gear mechanism obviates the previous necessity of utilizing a multiplicity of universal joints for such drive. In the present instance, irrespective of the direction of rotation of the drive shaft 25 connected through various mechanisms with the vehicle motor and irrespective of the degree of turning movement of the motor vehicle wheel, there will always be a constant and direct connection through the gear mechanism between the driven parts.

What I claim is:

A front wheel drive mechanism including a frame, an element pivoted on said frame, a wheel rotatably mounted on said element, a shaft rigid with said wheel, a driving shaft rotatable in said frame, and cooperating gear elements fixed on said shafts, said gear elements comprising wheels having radiating tooth portions extending substantially from their centers to their peripheries separated by grooves, said grooves being deeper at the centers than at the peripheries, the bottoms of said grooves forming straight lines substantially perpendicular to said shafts.

ROY E. BOHRER.